United States Patent [19]

Björkman

[11] Patent Number: 5,349,333
[45] Date of Patent: Sep. 20, 1994

[54] THREAT SECTOR INDICATING WARNER
[75] Inventor: Bengt Björkman, Järfälla, Sweden
[73] Assignee: Nobeltech Electronics AB, Jarfalla, Sweden
[21] Appl. No.: 992,633
[22] Filed: Dec. 21, 1992
[30] Foreign Application Priority Data
Dec. 20, 1991 [SE] Sweden .................. 9103793
[51] Int. Cl.⁵ .................................. G08B 21/00
[52] U.S. Cl. .................. 340/600; 340/540; 340/567; 342/20
[58] Field of Search ............... 340/600, 567, 540; 342/20, 465
[56] References Cited
U.S. PATENT DOCUMENTS

| | | | |
|---|---|---|---|
| 2,862,204 | 11/1958 | Henrichi et al. | 342/20 |
| 3,465,253 | 9/1969 | Rittenbach | 342/20 |
| 4,375,034 | 2/1983 | Guscott | 250/342 |
| 5,243,179 | 9/1993 | Bjorkman | 250/206.2 |

FOREIGN PATENT DOCUMENTS 144500 6/1981 Norway .

9100916 of 0000 Sweden .

Primary Examiner—Glen R. Swann, III
Attorney, Agent, or Firm—Pollock, Vande Sande & Priddy

[57] ABSTRACT

A warning apparatus for monitoring a plurality of threat sectors includes a receiving antenna for each threat sector for receiving electromagnetic radiation, an alarm channel for each respective threat sector and an amplifier interconnected between an output of the antenna on an input of the alarm channel. The alarm channel includes a high pass filter, a rectifier, an integrator and a comparator connected in series, an input of the filter constituting the input of the alarm channel, an output of the comparator constituting an output of the alarm channel. A threat sector activator is connected to an output of the comparator and activated by an output signal from the comparator in response to an input signal applied to the comparator from the integrator which exceeds a reference level, the activated threat sector indicator of the respective alarm channel indicating the threatened sector.

3 Claims, 1 Drawing Sheet

THREAT SECTOR INDICATING WARNER

FIELD OF THE INVENTION

The present invention relates to a warner indicating a threat sector for electromagnetic radiation, preferably laser light, incident towards the warner, the warner comprising a receiver antenna for the electromagnetic radiation of each sector, means for amplifying the antenna signals generated in the antennas by the electromagnetic radiation and means indicating in which sector a threat may be present after signal processing in signal processing means of the amplified antenna signals.

BACKGROUND OF THE INVENTION

Such a warner is, for example, known from NO, B 144 500. In the described embodiments of this reference there is a co-use of signals from more than one threat sector before a threat sector indicating means is activated.

SUMMARY OF THE INVENTION

It is an object of the present invention to obtain a non-complicated warner provided with separate channels for each threat sector. Hence, the channels are able to work quite independent of each other. According to the present invention the warner for each threat sector is allotted an alarm channel connected via intermediate amplifier means to the output of the receiver antenna and comprising an integrator and a comparator, arranged in this sequence, the alarm channels of which have their outputs coupled to the threat sector indicating means to activate a threat sector indicating means when the comparator determines that the output signal of the integrator exceeds a reference level, whereby the alarm channel first activating a threat sector indicating means indicates the sector threated. The alarm channels are built up from a very limited number of standard components.

The introduction in each channel of a high pass filter and a rectifier prior to the integrator eliminates a great deal of the 1/f-noise introduced in the signal by the amplifier means during processing. Accordingly, a preferred embodiment of the invention is characterized in that each alarm channel comprises a high pass filter and a rectifier arranged in series between the input of the alarm channel and its integrator.

The warner is intended for relatively high pulse frequencies of tens of kilohertz, in the frequency range of which the building up of the alarm channel has been found appropriate. More complicated warners intended to cover other, preferably lower pulse frequency ranges to easily complement a warner according to the invention. For example, a warner according to our SE patent application 9100916-7 corresponding to U.S. Pat. No. 5,243,179 is suitable for such a complementary addition.

BRIEF DESCRIPTION OF THE DRAWINGS

The present invention will be described in more detail below with reference to the accompanying drawings in which.

DETAILED DESCRIPTION OF THE PREFERRED EMBODIMENTS

Figure 1:
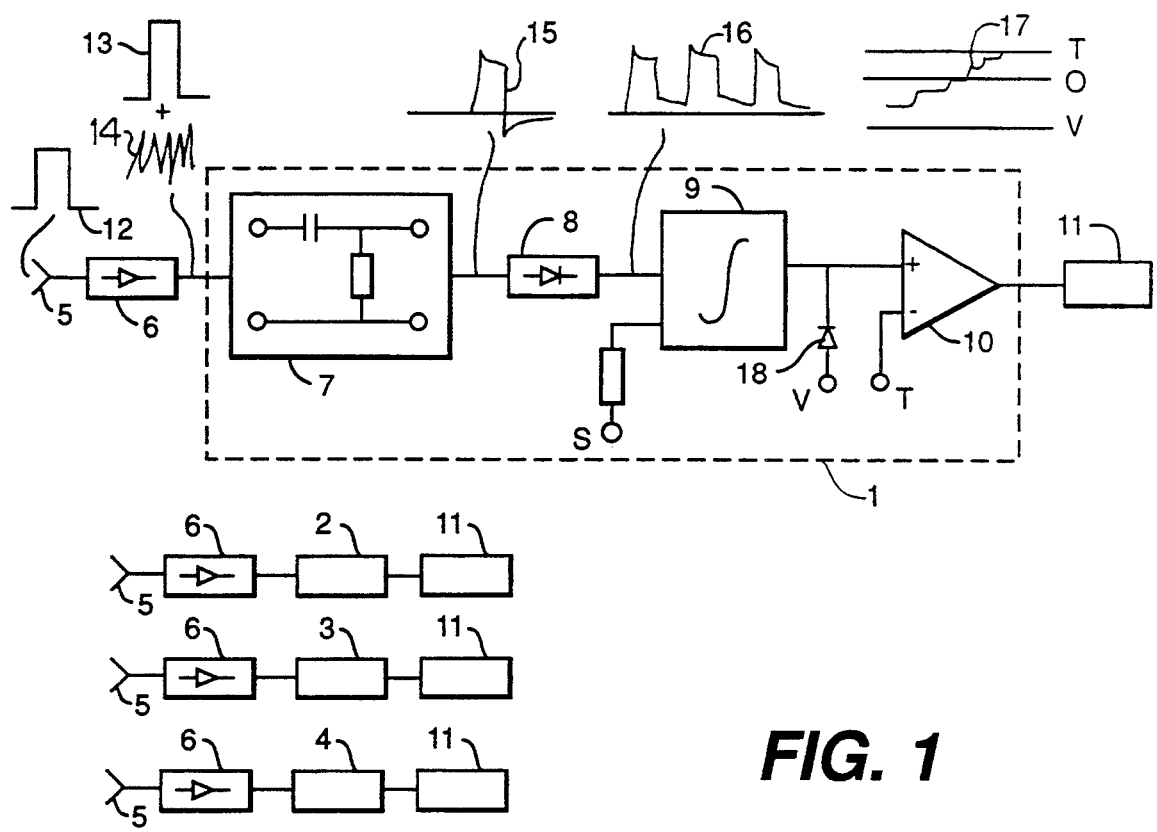
FIG. 1 schematically shows how the warner according to the invention may be realized.

The warner according to the present invention shown in FIG. 1 monitors four threat sectors and for that purpose it is built up of four separate parallel alarm channels 1-4, one of which channel 1, being shown in more detail.

Each threat sector is equipped with an antenna 5 for receiving electromagnetic radiation, preferably as laser light, incident within the threat sector. The antenna 5 is coupled to the input of an alarm channel 1, possibly via an amplifier 6 and possibly via some further, not shown, means. The amplifier and the further means may be included in a warner system in which the warner according to the invention is intended to be used as a complementary device for certain pulse frequency ranges.

A high pass filter 7, a rectifier 8, an integrator 9 and a comparator 10 are included in the alarm channel 1. The input of the high pass filter 7 is the input of the alarm channel and the output of the comparator 10 is the output of the alarm channel, the output being coupled to threat sector indicating means 11.

A pulse 12 emitted within a threat sector of an antenna 5 is received by the antenna 5 and applied to the alarm channel 1 after amplifying and possibly further signal processing. On the entrance or input of the alarm channel, that is the input signal of the high pass filter 7, a pulse 13 and added disturbances 14 added to the pulse 12 due to noise in the amplifier are found. After high pass filtering the input signal on the high pass filter 7 assumes a signal indicated by the reference numeral 15. The signal is rectified in the rectifier 8 and may for a plurality of pulses in series received within the threat sector assume the signal shape 16. The signal shape 16 is applied to one of the inputs of the integrator 9 and a fixed negative signal values is applied to the other input of the integrator. On the output of the integrator a signal is received which increases almost step-wise as long as the antenna receives pulses having a sufficient pulse frequency, pulse duration and signal level. The output signal of the integrator is designated as reference numeral 17. This output signal from the integrator is compared with a reference level T in a comparator and when the reference level T is exceeded the threat sector indicating means 11 is activated thereby indicating a threat within the threat sector referred to. An activated threat sector indicating means constitutes the basis for an evasive maneuver that the craft on which the warner is fixed should carry out.

The negative signal value S has for its object to prevent integration of noise and other disturbances, so that the output signal of the integrator reaches the reference level T even in absence of emitted pulses 12. In order to prevent that the output signal of the integrator 9, in an absence of emitted pulses 12, assumes an increasingly more negative value, a diode 18 is connected between the output of the integrator 9 and a negative voltage V. The diode ensures that the level of the output signal of the integrator does not fall below the voltage V.

Figure 2:
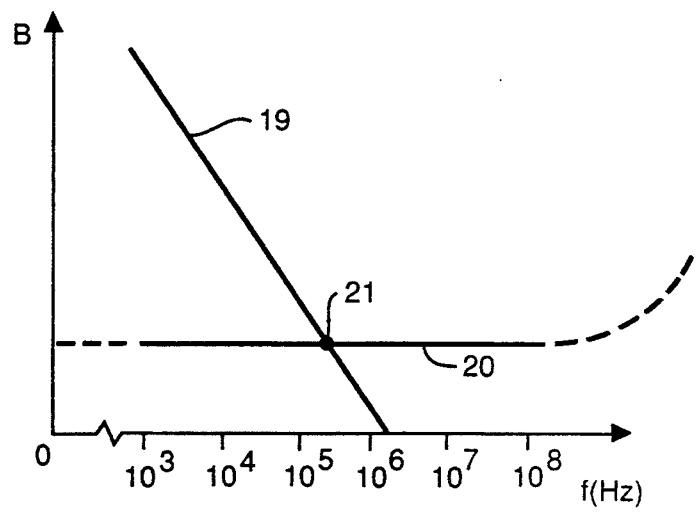
FIG. 2 illustrates the appearance of the noise arising in amplifiers.

In FIG. 2 the noise arising in the amplifier within the frequency range applicable for warners according to the present invention is schematically shown. More precisely the density B of the noise is shown as a function of the frequency f. The noise may be divided into two levels, namely 1/f-noise 19 and noise 20 having a constant density. A break point 21 is defined as the point in which the the level of the 1/f-noise intersects the level of the noise having a constant density. The introduction of a high pass filter 7 having a lower limiting frequency in the vicinity of the break point, enables an essential reduction of the influence of the difficult-to-handle 1/f-noise. In case of a break point 21 occuring at relatively low frequencies due to the use of well-operating amplifying means the high pass filter and the rectifier may be omitted.

I claim:

1. A warning apparatus for monitoring a plurality of threat sectors comprising;
   a receiving antenna for each threat sector for receiving electromagnetic radiation;
   an alarm channel for each respective threat sector;
   an amplifier interconnected between an output of said each antenna and an input of each corresponding alarm channel, said alarm channel including connected in series a high pass filter, a rectifier, an integrator and a comparator;
   an input of said filter constituting said input of said alarm channel, an output of said comparator constituting an output of said alarm channel; and
   a threat sector indicating means connected to said output of said comparator of each alarm channel and activated by an output signal from said comparator in response to an input signal applied to said comparator from said integrator exceeding a reference level, said activated threat sector indicating means of said respective alarm channel indicating the threatened sector.

2. A warning device according to claim 1 further comprising a diode connected between said output of said integrator, and a negative voltage, said diode conducting in a direction towards the output of said integrator.

3. A warning device for indicating a threat sector for electromagnetic radiation comprising:
   a plurality of threat sectors, each of said sectors including a receiving antenna for receiving electromagnetic radiation;
   means associated with each receiving antenna for amplifying signals from the corresponding receiving antenna;
   means for processing said amplified signals including for each sector an integrator and a comparator connected in series and a diode connected between an output of said integrator and a negative voltage, said diode conducting in a direction towards the output of said integrator; and
   a threat indicating means for each sector being activated by an output signal from said comparator generated when an input signal supplied to the corresponding comparator by said integrator exceeds a reference level, whereby said activated threat indicating means indicates the respective threatened sector.

* * * * *